(12) United States Patent
Hammerschmidt et al.

(10) Patent No.: US 10,661,656 B2
(45) Date of Patent: May 26, 2020

(54) PYROTECHNIC SWITCH AND INTERMEDIATE CIRCUIT DISCHARGE SYSTEM

(71) Applicant: Bayerische Motoren Werke Aktiengesellschaft, Munich (DE)

(72) Inventors: Thomas Hammerschmidt, Unterschleissheim (DE); Wladislaw Waag, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/281,399

(22) Filed: Feb. 21, 2019

(65) Prior Publication Data

US 2019/0184834 A1 Jun. 20, 2019

Related U.S. Application Data

(63) Continuation of application No. PCT/EP2017/078400, filed on Nov. 7, 2017.

(30) Foreign Application Priority Data

Nov. 15, 2016 (DE) .......................... 10 2016 222 339

(51) Int. Cl.
*B60L 3/04* (2006.01)
*B60L 3/00* (2019.01)
*H01H 39/00* (2006.01)

(52) U.S. Cl.
CPC .............. *B60L 3/04* (2013.01); *B60L 3/0007* (2013.01); *H01H 39/00* (2013.01); *H01H 39/006* (2013.01); *H01H 2039/008* (2013.01)

(58) Field of Classification Search
CPC ....... B60L 3/0007; B60L 3/04; H01H 39/006; H01H 2039/008
See application file for complete search history.

(56) References Cited

U.S. PATENT DOCUMENTS 5,793,275 A * 8/1998 Iversen ................ H01H 85/055
337/273
6,556,119 B1 * 4/2003 Lell ...................... H01H 37/323
180/279
(Continued)

FOREIGN PATENT DOCUMENTS

DE 197 12 387 A1 10/1997
DE 102 05 369 A1 8/2003
(Continued)

OTHER PUBLICATIONS

International Search Report (PCT/ISA/210) issued in PCT Application No. PCT/EP2017/078400 dated Jan. 29, 2018 with English translation (seven (7) pages).
(Continued)

*Primary Examiner* — Jacob R Crum
(74) *Attorney, Agent, or Firm* — Crowell & Moring LLP

(57) ABSTRACT

A pyrotechnic switch for switching off and establishing electric circuits includes a first electrical conductor, a second electrical conductor, and an ignition element. In a first state of the pyrotechnic switch, the first electrical conductor and the second electrical conductor are electrically connected to one another, wherein a target separation point between the first electrical conductor and the second electrical conductor is provided. The target separation point is separated as soon as the ignition element is triggered, wherein the pyrotechnic switch is provided with a third electrical conductor. In the first state of the pyrotechnic switch, the third electrical conductor is electrically separated from the second electrical conductor and from the third electrical conductor, and in a second state of the pyrotechnic switch, the third electrical conductor is electrically connected to the second electrical conductor.

14 Claims, 7 Drawing Sheets

(56) References Cited

U.S. PATENT DOCUMENTS

| | | | |
|---|---|---|---|
| 8,432,246 | B2 | 4/2013 | Suzuki et al. |
| 9,425,010 | B2* | 8/2016 | Hentschel ............ H01H 39/006 |
| 2006/0049027 | A1 | 3/2006 | Iversen |
| 2010/0328014 | A1 | 12/2010 | Suzuki et al. |
| 2011/0139595 | A1 | 6/2011 | Ishigaki |
| 2013/0175144 | A1 | 7/2013 | Sprenger et al. |
| 2013/0220095 | A1* | 8/2013 | Ukon ................... H01H 39/006 83/639.1 |

FOREIGN PATENT DOCUMENTS

| | | |
|---|---|---|
| DE | 102 09 627 A1 | 10/2003 |
| DE | 10 2008 013 831 A1 | 9/2009 |
| DE | 10 2009 056 865 A1 | 6/2011 |
| DE | 10 2010 035 684 A1 | 3/2012 |
| EP | 2 811 549 A1 | 12/2014 |

OTHER PUBLICATIONS

German-language Written Opinion (PCT/ISA/237) issued in PCT Application No. PCT/EP2017/078400 dated Jan. 29, 2018 (seven (7) pages).

German-language Search Report issued in counterpart German Application No. 10 2016 222 339.9 dated Jun. 8, 2017 with partial English translation (15 pages).

* cited by examiner

PYROTECHNIC SWITCH AND INTERMEDIATE CIRCUIT DISCHARGE SYSTEM

CROSS REFERENCE TO RELATED APPLICATIONS

This application is a continuation of PCT International Application No. PCT/EP2017/078400, filed Nov. 7, 2017, which claims priority under 35 U.S.C. § 119 from German Patent Application No. 10 2016 222 339.9, filed Nov. 15, 2016, the entire disclosures of which are herein expressly incorporated by reference.

BACKGROUND AND SUMMARY OF THE INVENTION

The present invention relates to a pyrotechnic switch for breaking electrical circuits, and to an intermediate circuit discharge system as well as a vehicle having the intermediate circuit discharge system.

Electric or hybrid vehicles have a high-voltage electrical system in which voltages in the range of between 60 V and several hundred volts (for example 400 V) can be applied. The high-voltage electrical system usually includes a high-voltage battery which is coupled to the rest of the high-voltage electrical system via a so-called intermediate circuit which contains at least one intermediate circuit capacitor. In the event of an electric or hybrid vehicle being involved in an accident, the high-voltage electrical system can present a potential hazard for occupants of the vehicle, other road users or emergency service personnel.

Therefore, it has to be possible to reliably disconnect the high-voltage electrical system, that is to say the high-voltage battery has to be reliably decoupled from the high-voltage electrical system, in the event of an accident.

Emergency switches serve to break electrical circuits in an emergency, in particular to disconnect electrical energy sources from connected electrical systems, said emergency switches being tripped and interrupting the electrical circuit as necessary. Emergency switches of this kind have to safely interrupt the electrical circuit without permitting unintended reconnection. In the event of an accident, the high-voltage battery of the electric vehicle has to be disconnected from the rest of the on-board electrical system in order to prevent a fire from starting.

After the high-voltage battery is disconnected from the high-voltage electrical system of an electric or hybrid vehicle, a considerable quantity of energy can still be stored in one or more intermediate circuit capacitors. For safety reasons, the high-voltage intermediate circuit, in particular the intermediate circuit capacitor or capacitors arranged therein, should therefore be discharged as quickly as possible to a relatively safe voltage level of, for example, less than 60 V (within a time period of, for example, less than 5 seconds).

The discharging of the high-voltage intermediate circuit can be controlled via the power electronics system. A discharge circuit can be provided for this purpose. The discharge period can be controlled via a switch in connection with a non-reactive resistor. Since the energy of high-voltage intermediate circuits can be discharged only slowly in the seconds range, for example 5-40 seconds, according to the current prior art, the energy could also lead to a safety risk.

As illustrated in FIG. 1 (prior art), the high-voltage components are provided with a passive and an active discharge branch in the intermediate circuit in the case of conventional electric vehicles. The passive discharging serves to discharge the intermediate circuit. The active discharging is switched on when a changeover is made to the inoperative state or in the event of a fault, for example crash, in order to reduce the available energy in the intermediate circuit. In the case of the current prior art, energy is reduced in the seconds range (for example 5-40 seconds). The longer the discharge process in the intermediate circuit, the greater the safety risk.

The requirements made of future high-voltage systems have considerably increased, that is to say the discharge periods have to be comparatively short. To date, there has been no satisfactory concept in respect of how the electrical energy stored in the intermediate circuit capacitors can be reliably reduced in a short time (for example 10-30 milliseconds) in emergency situations without large and expensive components which take up installation space.

Pyrotechnic switches, which are also called pyrotechnic fuses, serve to interrupt an electrical circuit in a targeted and safe manner when certain conditions occur. Pyrotechnic switches have a rapid disconnection response, this allowing the high-voltage battery to be safely disconnected from the high-voltage electrical system of a vehicle within an extremely short time after said vehicle is involved in a crash. Reference may be made, by way of example, to DE 102 09 627 A1 which discloses a pyrotechnic switch for disconnection purposes, which pyrotechnic switch has a body in which two conductor regions and a predetermined disconnection point, which is arranged between said conductor regions, are provided. A cavity in the body surrounds an ignition device. After the ignition device is tripped, the predetermined disconnection point is broken down into small pieces and therefore the two conductor regions are disconnected from one another. A pyrotechnic switch of this kind can serve only to break an electrical circuit.

The object of the present invention is to provide a pyrotechnic switch which is suitable for reliably disconnecting a high-voltage battery of an electric or hybrid vehicle from the high-voltage on-board electrical system and which furthermore still has an additional functionality. A further object of the invention is to provide an intermediate circuit discharge system comprising a pyrotechnic switch of this kind.

The pyrotechnic switch according to the invention comprises a first electrical conductor, a second electrical conductor, and an ignition element. In a first state of the pyrotechnic switch, the first electrical conductor and the second electrical conductor are electrically connected to one another. A predetermined disconnection point is provided between the first and the second electrical conductor. The predetermined disconnection point is disconnected, that is to say the first electrical conductor is isolated from the second electrical conductor, as soon as the ignition element is tripped. Therefore, the ignition or tripping of the ignition element causes disconnection of the predetermined disconnection point and therefore an interruption in the previously existing electrical connection between the first and the second electrical conductor.

The pyrotechnic switch according to the invention has a third electrical conductor. In the first state of the pyrotechnic switch, the third electrical conductor is electrically isolated from the first electrical conductor and from the second electrical conductor. In a second state of the pyrotechnic switch according to the invention, that is to say after the ignition element is tripped or ignited, the third electrical conductor is electrically connected to the second electrical conductor. However, in the second state, the third electrical conductor is still electrically isolated from the first electrical conductor.

A pyrotechnic switch of this kind can be used, in its first state, as an "electrical connection" between a high-voltage battery and a high-voltage on-board electrical system of a vehicle. Owing to the ignition of the ignition element, the pyrotechnic switch according to the invention moves to its second state in which the second and the third electrical conductor are connected to one another, and this can be used for the targeted discharging of capacitors, that is to say for the targeted reduction in electrical voltages (for example in an intermediate circuit of the high-voltage on-board electrical system).

The pyrotechnic switch preferably has a housing with a cavity in which the ignition element is arranged.

The ignition element can generate an increase in pressure in order to sever the predetermined disconnection point as soon as the ignition element is tripped.

In the second state of the pyrotechnic switch, the second electrical conductor and the third electrical conductor are connected to one another in such a way that the second electrical conductor is pushed against the third electrical conductor after the predetermined disconnection point is severed or vice versa, that is to say the third electrical conductor is pushed against the second electrical conductor after the predetermined disconnection point is severed. The tripping of the ignition element therefore causes a mechanical movement of the second or third electrical conductor relative to the other, so that the second and the third electrical conductor contact and are electrically connected to one another.

In the second state of the pyrotechnic switch, the first electrical conductor is preferably isolated not only from the second electrical conductor but rather also furthermore from the third electrical conductor.

The pyrotechnic switch can preferably have a disconnection bolt which can be electrically insulating when, in the second state of the pyrotechnic switch, the second and the third electrical conductor are directly electrically connected to one another.

An end face of the disconnection bolt preferably has a tapering, for example conical, portion, wherein the disconnection bolt disconnects the predetermined disconnection point in such a way that, after the ignition element is tripped, the tip of the conical portion pushes the second electrical conductor away from the first electrical conductor and interrupts the predetermined disconnection point.

In one variant of the invention, the ignition element is arranged in the first electrical conductor or integrated into the first electrical conductor. When the ignition element is tripped, the predetermined disconnection point is disconnected and the second electrical conductor is pushed away from the first electrical conductor, as a result of which the electrical connection between the first and the second electrical conductor is interrupted.

In a further variant of the invention, the pyrotechnic switch comprises a viscous material which serves to sever the predetermined disconnection point. After the ignition element is tripped, the viscous material pushes the second electrical conductor away from the first electrical conductor and interrupts the predetermined disconnection point.

The invention furthermore proposes an intermediate circuit discharge system in which the abovementioned pyrotechnic switch is used.

The intermediate circuit discharge system according to the invention, in particular for an electric or hybrid vehicle, has the above-described pyrotechnic switch and an intermediate circuit of a high-voltage electrical system of the vehicle, wherein the intermediate circuit has an intermediate circuit capacitor. The first electrical conductor of the pyrotechnic switch is connected to a high-voltage battery. The second electrical conductor of the pyrotechnic switch is connected to a first connection of the intermediate circuit capacitor, and the third electrical conductor of the pyrotechnic switch is connected to a second connection of the intermediate circuit capacitor.

In the first state of the pyrotechnic switch, the pyrotechnic switch connects a high-voltage battery to the intermediate circuit of the high-voltage electrical system of the electric or hybrid vehicle via the first and the second electrical conductor. In the second state of the pyrotechnic switch, the pyrotechnic switch connects the first connection of the intermediate circuit capacitor to the second connection of the intermediate circuit capacitor, as a result of which a discharge circuit is closed, the intermediate circuit capacitor being discharged via said discharge circuit. The intermediate circuit discharge system preferably has a discharge resistor, wherein the third electrical conductor of the pyrotechnic switch is connected to the second connection of the intermediate circuit capacitor via the discharge resistor. The discharge circuit is preferably dimensioned such that the voltage across the intermediate circuit capacitor is reduced to a voltage of less than 60 volts in a time period of less than 100 milliseconds.

The pyrotechnic switch can preferably be tripped by a tripping signal of the electric vehicle. The tripping signal may be, for example, a crash signal which is generated by a crash sensor and indicates that the electric or hybrid vehicle is or has been involved in a crash in which a predefined threshold for a degree of deformation and/or a predefined acceleration value have been exceeded.

The intermediate circuit capacitor preferably has a value of from 0.5 mF up to 4 mF. If this value is less than 4 mF, the capacitor is relatively cost-effective. If this value is greater than 0.5 mF, a few high-frequency ripples are produced, and this can have an adverse effect on the electromagnetic compatibility (EMC).

The discharge resistor preferably has a value of from 0.2 ohm up to 10 ohms. If this value is greater than 15 ohms, the discharge period is comparatively long. If this value is less than 0.1 ohm, the flowing current is comparatively large.

The present invention furthermore also proposes an electric vehicle or a hybrid vehicle comprising an abovementioned intermediate circuit discharge system.

According to the invention, a high-voltage battery can be disconnected from the on-board vehicle electrical system in the millisecond range after the tripping operation. The discharge circuit is connected by way of the pyrotechnic switch establishing a new electrical connection, that is to say a connection of the second and the third electrical conductor, after the tripping operation. The energy which is stored in the intermediate circuit can be reduced completely or at least to an extent such that danger to emergency service personnel is precluded, by means of the intermediate circuit discharge system comprising the pyrotechnic switch according to the invention, within a very short time period (for example 1-10 milliseconds after the pyrotechnic switch is tripped).

Owing to the invention, the time which is required for discharging the intermediate circuit can be reduced by a factor of 1000 (milliseconds instead of seconds) in comparison to the prior art, without increasing the costs and the installation space for the discharge circuit.

The basis of the invention is the use of a pyrotechnic switch as a disconnection element in the high-voltage storage device. The pyrotechnic switch can both safely disconnect the high-voltage battery from the rest of the high-voltage on-board electrical system and also establish a new connection after the pyrotechnic switch is tripped, so that a discharge circuit can be formed, said discharge circuit discharging the energy which is stored in the intermediate circuit capacitors of the high-voltage components.

High currents can be transmitted by the comparatively solid contacts (first, second electrical conductors) of the pyrotechnic switch, which high currents allow discharge of the intermediate circuit in the millisecond range. Owing to the irreversible nature of the process, the connection between the high-voltage storage device and the high-voltage components cannot be unintentionally re-established. The contact which is closed during the tripping of the pyrotechnic switch is closed only one single time. Therefore, the reliability is also certainly ensured. Special coatings which are necessary for electromechanical switches which open/close several times are not required.

The electromechanical switch shown in FIG. 1 (prior art) can be replaced by a pyrotechnic switch according to the invention. In addition, a pyrotechnic switch is more cost-effective than an electromechanical switch. The pyrotechnic switch according to the invention allows more rapid discharging of the intermediate circuit and constitutes a cost-effective, reliable and installation space-saving solution.

Other objects, advantages and novel features of the present invention will become apparent from the following detailed description of one or more preferred embodiments when considered in conjunction with the accompanying drawings.

DETAILED DESCRIPTION OF THE DRAWINGS

The exemplary embodiments explained below constitute preferred embodiments of the present invention. It goes without saying that the present invention is not limited to these embodiments.

Figure 1:
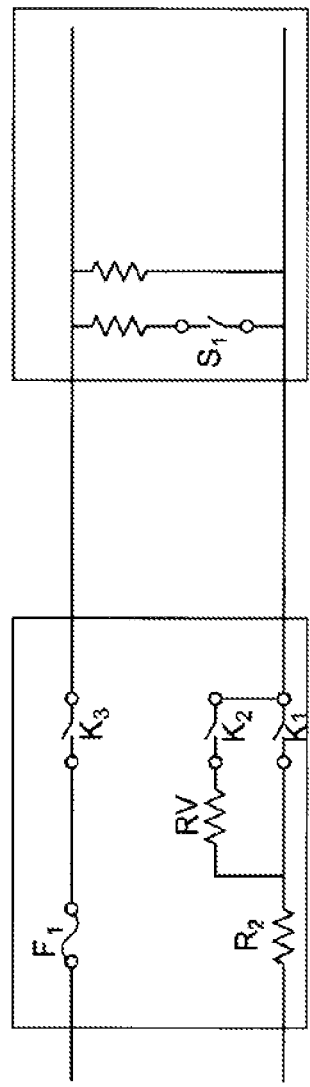
FIG. 1 shows a discharge circuit which is known from the prior art.
Figure 2:
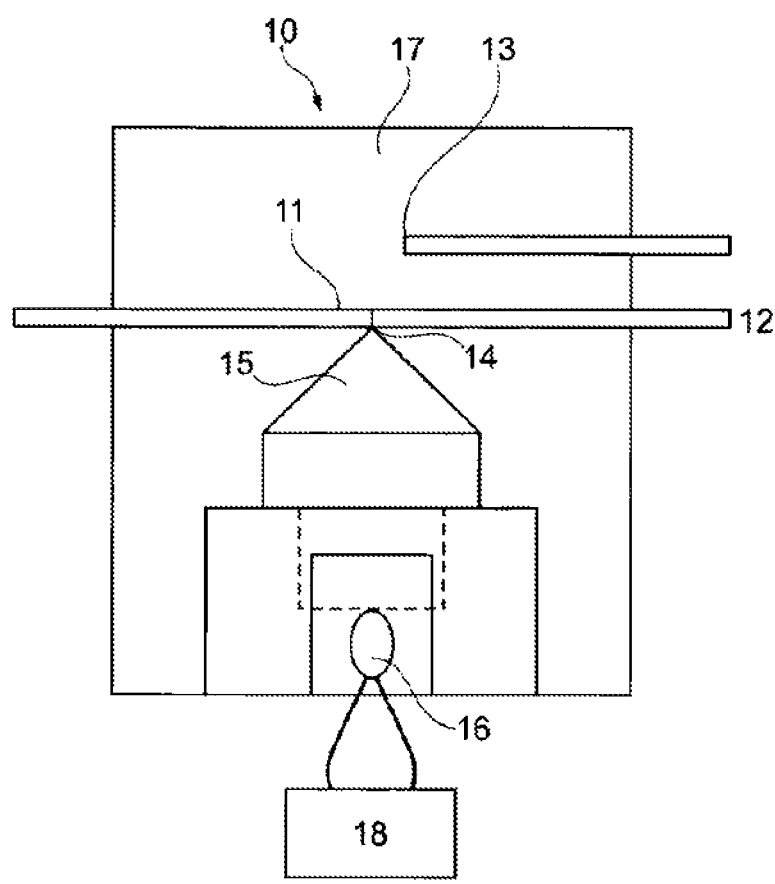
FIG. 2 shows a pyrotechnic switch according to a first exemplary embodiment of the invention during normal operation.

FIG. 2 shows a pyrotechnic switch 10 for breaking and connecting electrical circuits according to a first exemplary embodiment of the invention. The pyrotechnic switch 10 comprises a first electrical conductor 11, a second electrical conductor 12 and a third electrical conductor 13. The electrical conductors 11, 12 and 13 are arranged in a housing 17 of the pyrotechnic switch 10. The housing 17 has a cavity in which an ignition element 16 is arranged.

In a normal operating state of the pyrotechnic switch 10 (state shown in FIG. 2), the first electrical conductor 11 and the second electrical conductor 12 are electrically connected to one another. A predetermined disconnection point 14 of the pyrotechnic switch 10 connects one end of the first electrical conductor 11 to one end of the second electrical conductor 12. In the normal operating state of the pyrotechnic switch 10, the third electrical conductor 13 is electrically isolated from the second electrical conductor 12 and the third electrical conductor 13. In a normal operating state, currents can flow between the first electrical conductor 11 and the second electrical conductor 12 via the predetermined disconnection point 14.

The pyrotechnic switch 10 further has a disconnection bolt 15 which can sever the predetermined disconnection point 14 between the first electrical conductor 11 and the second electrical conductor 12 after the ignition element 16 is tripped. The disconnection bolt 15 is preferably electrically insulating. An end face of the disconnection bolt 15 comprises a conical portion.

As soon as the ignition element 16 is tripped by the control unit 18, the ignition element 16 generates a pressure. The pressure causes the disconnection bolt 15 to move upward and isolates the first electrical conductor 11 from the second electrical conductor 12 at the predetermined disconnection point 14.

The electrical conductors 11, 12 and 13 are composed of metal, for example of copper, which can be deformed under pressure or the action of force. The tip of the conical portion of the disconnection bolt 15 pushes the end of the second electrical conductor 12 away from the end of the first electrical conductor 11, so that the predetermined disconnection point 14 is interrupted after the ignition element 16 is tripped.

Figure 3:
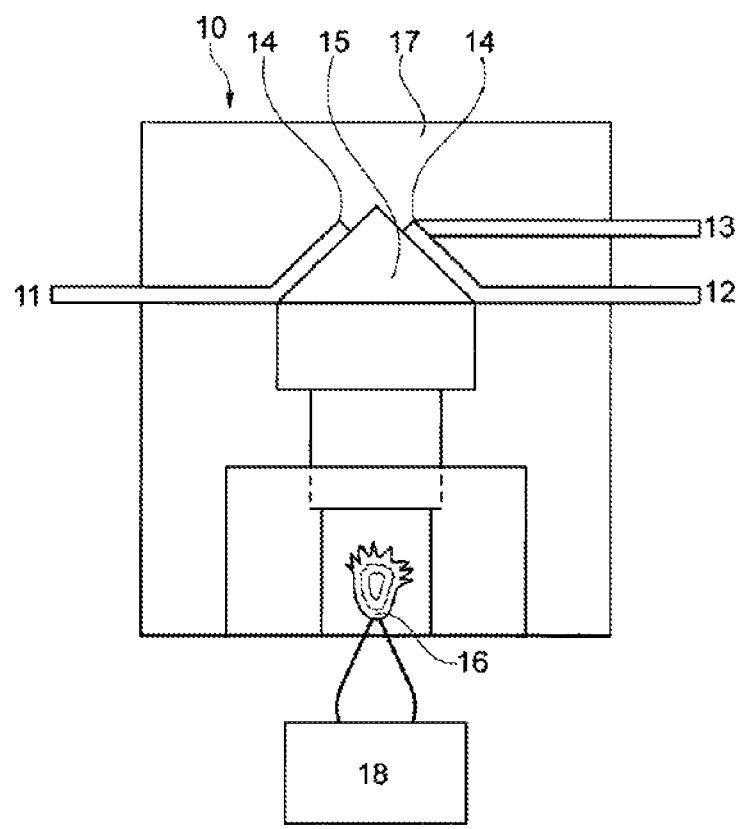
FIG. 3 shows the pyrotechnic switch of FIG. 2 after the tripping operation.

FIG. 3 shows the pyrotechnic switch 10 of FIG. 2 in a tripped state. The ignition element 16 has a detonator comprising the pyrotechnic ignition material and two control contacts. When a current is fed into the detonator via the control line, the detonator ignites the ignition material. The moving disconnection bolt 15, which moves in the direction of the predetermined disconnection point 14 owing to the increase in pressure in the cavity of the housing 17, is attached to the ignition material via the detonator. The disconnection bolt 15 pushes the end of the second electrical conductor 12 away from the end of the first electrical conductor 11. Since the material of the electrical conductor 12 is deformed by disconnection bolt 15, that is to say is bent upward, the predetermined disconnection point 14 is severed. The current flowing between the electrical conductors 11 and 12 is therefore interrupted.

After the predetermined disconnection point 14 is severed, the disconnection bolt 15 pushes the second electrical conductor 12 further in the direction of the third electrical conductor 13, so that, after the pyrotechnic switch 10 is tripped, the second electrical conductor 12 and the third electrical conductor 13 are connected to one another.

The disconnection bolt 15 pushes the end of the first electrical conductor 11 away from the predetermined disconnection point 14. In the tripped state of the pyrotechnic switch 10, the first electrical conductor 11 is electrically isolated from the second electrical conductor 12 and the third electrical conductor 13. Owing to the irreversible nature of the pyrotechnic switch 10, the connection between the first electrical conductor 11 and the second electrical conductor 12 cannot be re-established. In the second state, that is to say after the pyrotechnic switch 10 is tripped, the second electrical conductor 12 is connected to the third electrical conductor 13. In this state, a current can flow between the second electrical conductor 12 and the third electrical conductor 13.

The disconnection bolt 15 can be replaced, for example, by a viscous material, for example gel or oil, together with a pushing device. The viscous material is located in a closed-off area which is closed by the connected first and second electrical conductors 11 and 12 on one side and by the pushing device on the other side. After the ignition element 16 is tripped or ignited, the pushing device slides in the direction of the viscous material owing to an increase in pressure. The viscous material therefore pushes the predetermined disconnection point 14, so that the second electrical conductor 12 is pushed away from the first electrical conductor 11 and the predetermined disconnection point 14 is interrupted by the viscous material. After the predetermined disconnection point 14 is severed, the viscous material pushes the second electrical conductor 12 further in the direction of the third electrical conductor 13, so that, after the pyrotechnic switch 10 is tripped, the second electrical conductor 12 and the third electrical conductor 13 are connected to one another.

According to the invention, the high-voltage storage device can be disconnected from the vehicle in the millisecond range after the tripping operation. Furthermore, the pyrotechnic switch 10 establishes a new connection between the second electrical conductor 12 and the third electrical conductor 13 after the tripping operation.

Figure 4:
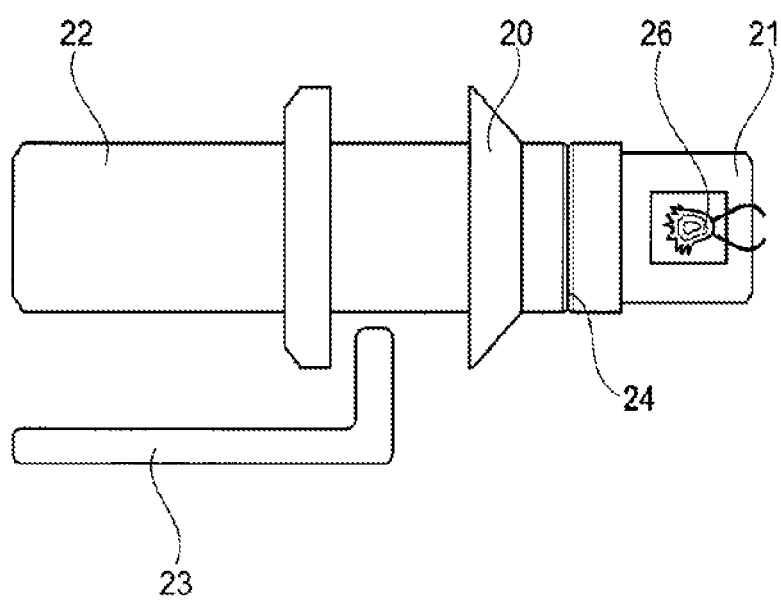
FIG. 4 shows a pyrotechnic switch according to a second exemplary embodiment during normal operation.
Figure 5:
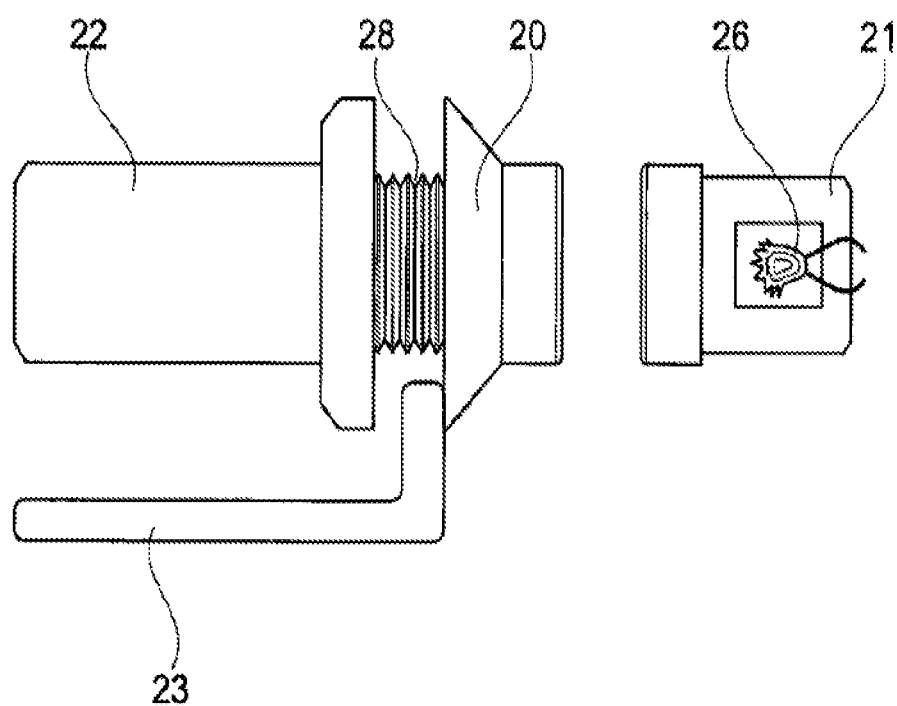
FIG. 5 shows the pyrotechnic switch of FIG. 4 after the tripping operation.

FIG. 4 and FIG. 5 show a pyrotechnic switch 20 according to a second embodiment of the invention.

FIG. 4 shows the pyrotechnic switch 20 according to the second embodiment of the invention in a normal operating state. The pyrotechnic switch 20 comprises a first electrical conductor 21, a second electrical conductor 22 and a third electrical conductor 23. The first electrical conductor 21 has a cavity in which an ignition element 26 is arranged.

In the normal operating state of the pyrotechnic switch 20, the first electrical conductor 21 and the second electrical conductor 22 are connected to one another. A predetermined disconnection point 24 of the pyrotechnic switch 20 connects one end of the first electrical conductor 21 to one end of the second electrical conductor 22. In the normal operating state of the pyrotechnic switch 20, the third electrical conductor 23 is electrically isolated from the second electrical conductor 22 and the first electrical conductor 21. In a normal operating state, currents can flow between the first electrical conductor 21 and the second electrical conductor 22 via the predetermined disconnection point 24.

As soon as the ignition element 26 is tripped, the ignition element 26 generates an increase in pressure. Owing to the increase in pressure, the second electrical conductor 22 is pushed away from the first electrical conductor 21.

FIG. 5 shows the pyrotechnic switch 20 of FIG. 4 in a tripped state. The portion 28, for example a foldable sleeve, of the electrical conductor 22 can be displaced or compressed or "folded" by a force, which is exerted on it, in a longitudinal direction of the second electrical conductor 22, so that the predetermined disconnection point 24 is interrupted after the ignition element 26 is tripped. The ignition element 26 has a detonator comprising the pyrotechnic ignition material and two control contacts. When a current is fed into the detonator via the control line, the detonator ignites the ignition material. The first electrical conductor 21 pushes the end of the second electrical conductor 22 away from the end of the first electrical conductor 21. Since the portion 28 of the electrical conductor 12 is displaced or compressed or folded, the predetermined disconnection point 24 is severed. The electrical connection between the electrical conductors 21 and 22 is therefore interrupted.

After the predetermined disconnection point 24 is severed, the portion 28 of the second electrical conductor 12 is folded away from the electrical conductor 21 in the longitudinal direction of the second electrical conductor 22 by the pressure which is generated by the explosion of the pyrotechnic ignition material of the ignition element 26, so that, after the pyrotechnic switch 20 is tripped, the second electrical conductor 22 and the third electrical conductor 23 are electrically connected to one another, as illustrated in FIG. 5.

In the tripped state of the pyrotechnic switch 20, the first electrical conductor 21 is electrically isolated from the second electrical conductor 22 and the third electrical conductor 23. Owing to the irreversible nature of the pyrotechnic switch 20, the connection between the first electrical conductor 21 and the second electrical conductor 22 cannot be re-established. In the state after the pyrotechnic switch 20 is tripped, the second electrical conductor 22 is connected to the third electrical conductor 23. In this state, a current can flow between the second electrical conductor 22 and the third electrical conductor 23.

Since the cavity in which the ignition element 26 is arranged is provided in the first electrical conductor 21 and a disconnection bolt is not required for the pyrotechnic switch 20, the costs of and the installation space required by the pyrotechnic switch 20 can be further reduced.

Figure 6:
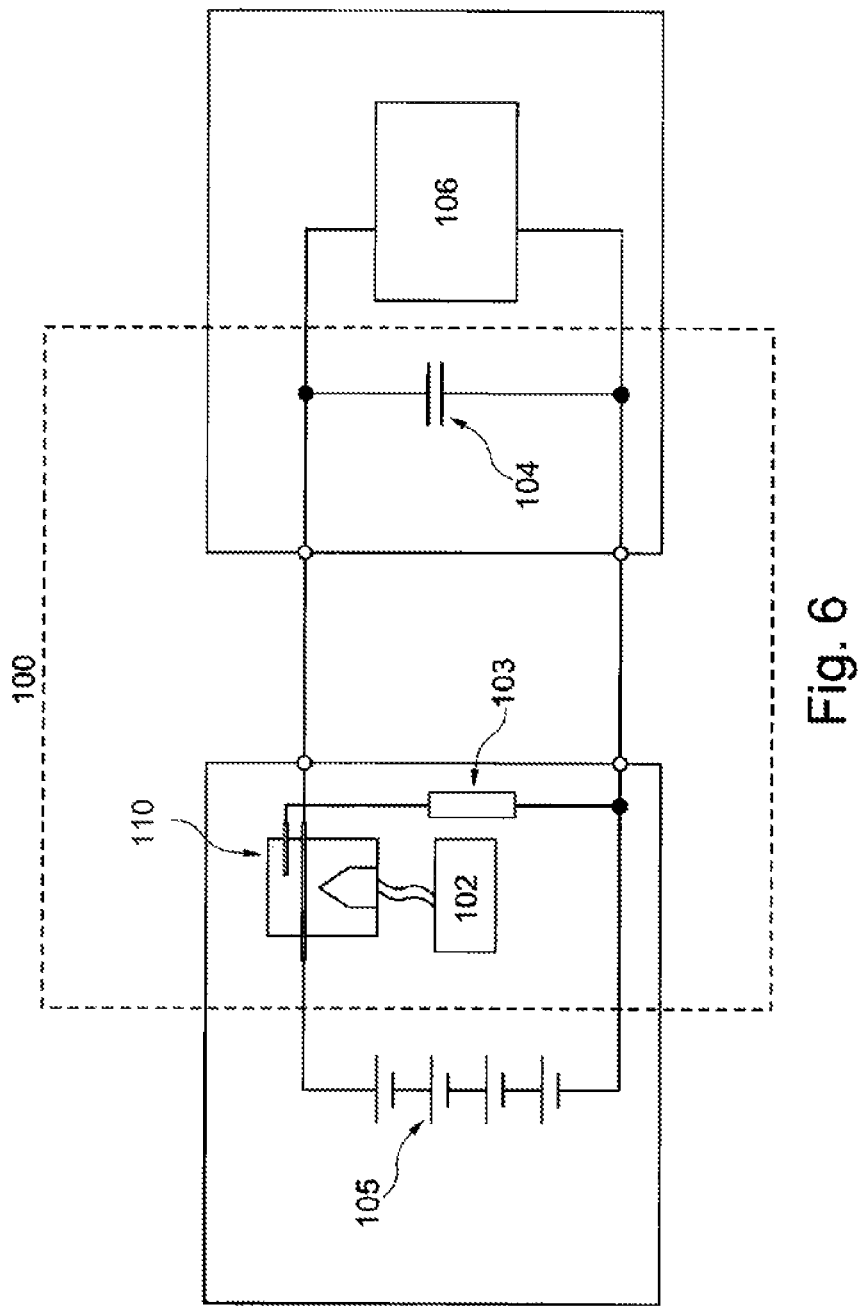
FIG. 6 shows a schematic illustration of an intermediate circuit discharge system according to the invention during normal operation.

FIG. 6 shows an intermediate circuit discharge system 100 which has one of the above-described pyrotechnic switches 110 and an intermediate circuit comprising an intermediate circuit capacitor 104. The intermediate circuit discharge system 100 is connected between a high-voltage battery 105 and a high-voltage component 106. The pyrotechnic switch 110 serves to sever the connection between the high-voltage battery 105 and the intermediate circuit or the high-voltage component 106 and also—in the event of an emergency or in the event of the vehicle being involved in an accident—to close a discharge circuit 104.

The first electrical conductor of the pyrotechnic switch 110 is connected to a high-voltage battery 105. The second electrical conductor of the pyrotechnic switch 110 is connected to a first connection of the intermediate circuit capacitor 104. The third electrical conductor of the pyrotechnic switch 110 is connected to a second connection of the intermediate circuit capacitor 104. In addition, the intermediate circuit discharge system 100 has a discharge resistor 103. The third electrical conductor of the pyrotechnic switch 110 is connected to a second connection of the intermediate circuit capacitor 104 via the discharge resistor 103.

The intermediate circuit capacitor 104 has a value of from 0.5 mF up to 4 mF. If this value is greater than 4 mF, the intermediate circuit capacitor is considerably more expensive. If this value is less than 0.5 mF, more high-frequency ripple is produced, and this can have an adverse effect on the electromagnetic compatibility (EMC). Thus, the intermediate circuit capacitor 104 preferably has a value of from 1.5 mF up to 3 mF.

The discharge resistor 103 has a value of from 0.2 ohm up to 10 ohms. If this value is greater than 10 ohms, the discharging is comparatively slow. If this value is less than 0.2 ohm, the flowing current is comparatively large. Thus, the discharge resistor 103 preferably has a value of from 1 ohm up to 6 ohms.

In a normal operating state of the high-voltage battery 105, the pyrotechnic switch 110 connects the high-voltage battery 105 to the intermediate circuit or to the high-voltage component 106. The electrical circuit between the high-voltage battery 105 and the intermediate circuit is short-circuited, so that the high-voltage battery 105 supplies power to the high-voltage component 106.

In the event of a crash, the pyrotechnic switch 110 is activated by a tripping signal 102. The pyrotechnic switch 110 then disconnects the connection between the high-voltage battery 105 and the high-voltage component 106. As mentioned above, a considerable quantity of energy can still be stored in the intermediate circuit capacitor 104, it being necessary to reduce said quantity of energy, that is to say it being necessary to discharge the intermediate circuit capacitor 104, for safety reasons.

Figure 7:
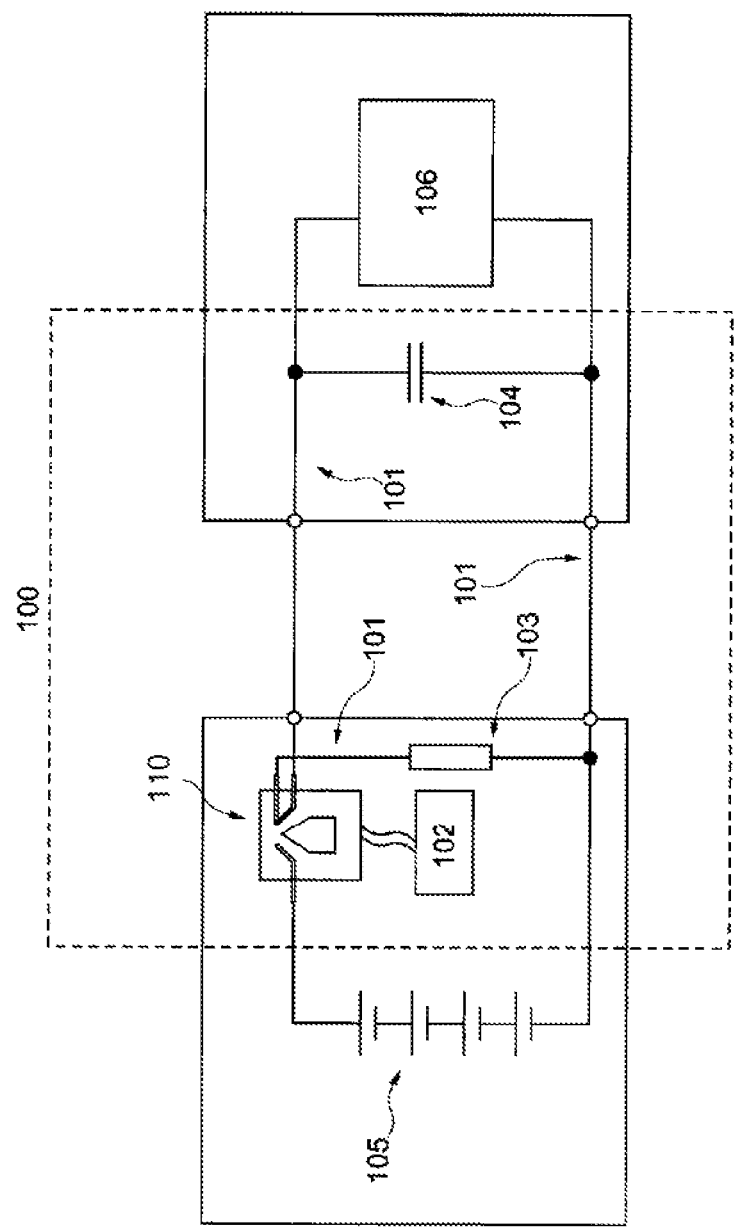
FIG. 7 shows a schematic illustration of the intermediate circuit discharge system according to the invention after the pyrotechnic switch is tripped.

FIG. 7 shows the intermediate circuit discharge system 100 with the pyrotechnic switch 110 in a tripped state. According to the invention, the pyrotechnic switch 110 connects the intermediate circuit capacitor 104 to the discharge resistor 103 after the connection between the high-voltage battery 105 and the high-voltage component 106 is severed, that is to say, in the tripped state of the pyrotechnic switch 110, the first connection of the intermediate circuit capacitor 104 is connected to the second connection of the intermediate circuit capacitor 104 via the discharge resistor 103. Therefore, a discharge circuit 101 is closed, so that the energy which is stored in the intermediate circuit capacitor 104 can be discharged by means of the discharge circuit 101 via the discharge resistor 103.

The energy which is stored in the intermediate circuit can be discharged by means of the intermediate circuit discharge system 100 comprising the pyrotechnic switch according to the invention within, for example, 1-10 milliseconds after the pyrotechnic switch is tripped. Consequently, the electric vehicle can be touched without risk a few milliseconds after the pyrotechnic switch is tripped.

LIST OF REFERENCE SYMBOLS

10 Pyrotechnic switch
11 First electrical conductor
12 Second electrical conductor
13 Third electrical conductor
14 Predetermined disconnection point
15 Disconnection bolt
16 Ignition element
17 Housing
20 Pyrotechnic switch
21 First electrical conductor
22 Second electrical conductor
23 Third electrical conductor
24 Predetermined disconnection point
26 Ignition element
28 A portion of the second electrical conductor
100 Intermediate circuit discharge system
101 Discharge circuit
102 Tripping signal
103 Discharge resistor
104 Intermediate circuit capacitor
105 High-voltage battery
106 High-voltage component
110 Pyrotechnic switch The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pyrotechnic switch for breaking and creating electrical circuits, comprising:
   a first electrical conductor;
   a second electrical conductor;
   an ignition element, wherein
      in a first state of the pyrotechnic switch, the first electrical conductor and the second electrical conductor are electrically connected to one another,
      a predetermined disconnection point is provided between the first electrical conductor and the second electrical conductor, the predetermined disconnection point being disconnected as soon as the ignition element is tripped;
   a third electrical conductor, wherein
      in the first state of the pyrotechnic switch, the third electrical conductor is electrically isolated from the first electrical conductor and from the second electrical conductor,
      in a second state of the pyrotechnic switch, the third electrical conductor is electrically connected to the second electrical conductor,
      the ignition element is arranged in the first electrical conductor or integrated into the first electrical conductor, and
      when the ignition element is tripped, the predetermined disconnection point is disconnected and the second electrical conductor is pushed away from the first electrical conductor.

2. The pyrotechnic switch as claimed in claim 1, further comprising:
   a housing with a cavity in which the ignition element is arranged.

3. The pyrotechnic switch as claimed in claim 1, wherein the ignition element generates an increase in pressure in order to sever the predetermined disconnection point as soon as the ignition element is tripped.

4. A pyrotechnic switch for breaking and creating electrical circuits, comprising:
   a first electrical conductor;
   a second electrical conductor;
   an ignition element, wherein
      in a first state of the pyrotechnic switch, the first electrical conductor and the second electrical conductor are electrically connected to one another,
      a predetermined disconnection point is provided between the first electrical conductor and the second electrical conductor, the predetermined disconnection point being disconnected as soon as the ignition element is tripped; and
   a third electrical conductor, wherein
      in the first state of the pyrotechnic switch, the third electrical conductor is electrically isolated from the first electrical conductor and from the second electrical conductor, wherein
      in the second state of the pyrotechnic switch, the second electrical conductor and the third electrical conductor are electrically connected to one another by way of the second electrical conductor being pushed against the third electrical conductor after the predetermined disconnection point is severed or the third electrical conductor being pushed against the second electrical conductor after the predetermined disconnection point is severed.

5. The pyrotechnic switch as claimed in claim 4, wherein
in the second state of the pyrotechnic switch, the first electrical conductor is electrically isolated from the second electrical conductor and from the third electrical conductor.

6. The pyrotechnic switch as claimed in claim 1, wherein the pyrotechnic switch has a disconnection bolt which is electrically insulating.

7. The pyrotechnic switch as claimed in claim 6, wherein
an end face of the disconnection bolt has a conical portion, and
the disconnection bolt disconnects the predetermined disconnection point such that, after the ignition element is tripped, a tip of the conical portion pushes the second electrical conductor away from the first electrical conductor and interrupts the predetermined disconnection point.

8. An intermediate circuit discharge system for an electric or hybrid vehicle, comprising:
a pyrotechnic switch as claimed in claim 1;
an intermediate circuit of a high-voltage electrical system of the electric or hybrid vehicle, wherein
the intermediate circuit has an intermediate circuit capacitor,
the first electrical conductor of the pyrotechnic switch is connected to a high-voltage battery,
the second electrical conductor of the pyrotechnic switch is connected to a first connection of the intermediate circuit capacitor, and
the third electrical conductor of the pyrotechnic switch is connected to a second connection of the intermediate circuit capacitor.

9. The intermediate circuit discharge system as claimed in claim 8, wherein
in the first state of the pyrotechnic switch, the high-voltage battery is connected to the intermediate circuit via the first and the second electrical conductor of the pyrotechnic switch, and
in the second state of the pyrotechnic switch, the pyrotechnic switch connects the first connection of the intermediate circuit capacitor to the second connection of the intermediate circuit capacitor in order to close a discharge circuit.

10. The intermediate circuit discharge system as claimed in claim 8, wherein
the intermediate circuit discharge system has a discharge resistor, wherein the third electrical conductor of the pyrotechnic switch is connected to the second connection of the intermediate circuit capacitor via the discharge resistor.

11. The intermediate circuit discharge system as claimed in claim 8, wherein
the pyrotechnic switch is tripable by a tripping signal of the electric or hybrid vehicle.

12. The intermediate circuit discharge system as claimed in claim 8, wherein
the intermediate circuit capacitor has a value of from 0.5 mF up to 4 mF.

13. The intermediate circuit discharge system as claimed in claim 10, wherein
the discharge resistor has a value of from 0.2 ohm up to 10 ohms.

14. An electric vehicle or hybrid vehicle, comprising:
an intermediate circuit discharge system as claimed in claim 8.

* * * * *